(12) United States Patent
Shahar et al.

(10) Patent No.: US 8,751,701 B2
(45) Date of Patent: Jun. 10, 2014

(54) HOST CHANNEL ADAPTER WITH PATTERN-TYPE DMA

(75) Inventors: Ariel Shahar, Jerusalem (IL); Noam Bloch, Bat Shlomo (IL); Adi Fuchs, Haifa (IL)

(73) Assignee: Mellanox Technologies Ltd., Yokneam (IL)

( * ) Notice: Subject to any disclaimer, the term of this patent is extended or adjusted under 35 U.S.C. 154(b) by 352 days.

(21) Appl. No.: 13/337,178

(22) Filed: Dec. 26, 2011

(65) Prior Publication Data

US 2013/0166793 A1 Jun. 27, 2013

(51) Int. Cl.
*G06F 13/28* (2006.01)

(52) U.S. Cl.
CPC ..................................... *G06F 13/28* (2013.01)
USPC ............................................. 710/26; 710/22

(58) Field of Classification Search
CPC ....................................................... G06F 13/28
USPC ...................................................... 710/22, 26
See application file for complete search history.

(56) References Cited

U.S. PATENT DOCUMENTS

| | | | |
|---|---|---|---|
| 6,789,143 B2 | 9/2004 | Craddock et al. | |
| 7,263,103 B2 | 8/2007 | Kagan et al. | |
| 8,051,212 B2 | 11/2011 | Kagan et al. | |
| 8,176,252 B1 * | 5/2012 | Alexander et al. | 711/118 |
| 8,495,301 B1 * | 7/2013 | Alexander et al. | 711/118 |
| 2003/0046530 A1 | 3/2003 | Poznanovic | |
| 2010/0262973 A1 * | 10/2010 | Ernst et al. | 718/104 |

OTHER PUBLICATIONS

Infiniband Trade Association, "InfiniBandTM Architecture Specification", vol. 1, Release 1.21, Nov. 2007.
"MPI: A Message-Passing Interface Standard", Version 2.2, Message Passing Interface Forum, Sep. 4, 2009.
Shah et al., "Direct Data Placement over Reliable Transports", IETF Network Working Group, RFC 5041, Oct. 2007.
Culley et al., "Marker PDU Aligned Framing for TCP Specification", IETF Network Working Group, RFC 5044, Oct. 2007.
U.S. Appl. No. 13/280,457, filed Oct. 25, 2011.

* cited by examiner

*Primary Examiner* — Ernest Unelus
(74) *Attorney, Agent, or Firm* — D. Kligler I.P. Services Ltd.

(57) ABSTRACT

An input/output (I/O) device includes a memory buffer and off-loading hardware. The off-loading hardware is configured to accept from a host a scatter/gather list including one or more entries. The entries include at least a pattern-type entry that specifies a period of a periodic pattern of addresses that are to be accessed in a memory of the host. The off-loading hardware is configured to transfer data between the memory buffer of the I/O device and the memory of the host by accessing the addresses in the memory of the host in accordance with the periodic pattern at intervals indicated in the period.

22 Claims, 4 Drawing Sheets

| | PATTERN-TYPE ENTRY |||||||||||||||||||||||||||||||||
|---|---|---|---|---|---|---|---|---|---|---|---|---|---|---|---|---|---|---|---|---|---|---|---|---|---|---|---|---|---|---|---|---|
| | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| 0 | bytecount_per_cycle |||||||||||||||||||||||||||||||||
| 4 | 0x00000004 |||||||||||||||||||||||||||||||||
| 8 | cycle_count |||||||||||||||||||||||||||||||||
| c | reserved |||||||||||||||| num_entries ||||||||||||||||
| 10 | bytecount_per_cycle |||||||||||||||||||||||||||||||||
| 14 | 0x00000005 |||||||||||||||||||||||||||||||||
| 18 | cycle_count |||||||||||||||||||||||||||||||||
| 1c | reserved |||||||||||||||| num_entries ||||||||||||||||
| 20 | stride |||||||||||||||||||||||||||||||||
| 24 | reserved |||||||||||||||||||||||||||||||||
| 28 | reserved |||||||||||||||||||||||||||||||||
| 2c | reserved |||||||||||||||||||||||||||||||||
| 30 | stride |||||||||||||||| byte count ||||||||||||||||
| 34 | mem_key |||||||||||||||||||||||||||||||||
| 38 | va_hi |||||||||||||||||||||||||||||||||
| 3c | va_lo |||||||||||||||||||||||||||||||||
| 40 | stride |||||||||||||||| byte count ||||||||||||||||
| 44 | mem_key |||||||||||||||||||||||||||||||||
| 48 | va_hi |||||||||||||||||||||||||||||||||
| 4c | va_lo |||||||||||||||||||||||||||||||||
| 50 | stride |||||||||||||||| byte count ||||||||||||||||
| 54 | mem_key |||||||||||||||||||||||||||||||||
| 58 | va_hi |||||||||||||||||||||||||||||||||
| 5c | va_lo |||||||||||||||||||||||||||||||||

FIG. 5

HOST CHANNEL ADAPTER WITH PATTERN-TYPE DMA

FIELD OF THE INVENTION

The present invention relates generally to data communication, and particularly to methods and systems for direct memory access in network interfaces.

BACKGROUND OF THE INVENTION

Some network interfaces, such as some Infiniband Host Channel Adapters (HCAs), use scatter/gather lists for gathering data from memory in preparation for transmission, and for scattering received data into memory. HCAs of this sort are described, for example, in U.S. Pat. No. 8,051,212, whose disclosure is incorporated herein by reference.

SUMMARY OF THE INVENTION

An embodiment of the present invention that is described herein provides an input/output device including a memory buffer and off-loading hardware. The off-loading hardware is configured to accept from a host a scatter/gather list including one or more entries. The entries include at least a pattern-type entry that specifies a period of a periodic pattern of addresses that are to be accessed in a memory of the host. The off-loading hardware is configured to transfer data between the memory buffer of the input/output device and the memory of the host by accessing the addresses in the memory of the host in accordance with the periodic pattern at intervals indicated in the period.

In some embodiments, the pattern-type entry specifies two or more periodic patterns that are nested in one another, and the hardware circuitry is configured to access the addresses by scanning the nested periodic patterns. In an embodiment, by accessing the addresses in accordance with the periodic pattern, the hardware circuitry is configured to access a partial subset of columns of a matrix that is stored, row after row, in a sequential range of the addresses.

In another embodiment, by accessing the addresses in accordance with the periodic pattern, the hardware circuitry is configured to access a partial sub-range of a multi-dimensional data structure that is stored in a sequential range of the addresses. In yet another embodiment, by accessing the addresses in accordance with the periodic pattern, the hardware circuitry is configured to interleave two or more data structures that are stored in separate address ranges in the memory of the host.

In a disclosed embodiment, the scatter/gather list further includes one or more single-range entries that specify respective contiguous address ranges that are to be accessed in the memory of the host, and the off-loading hardware is configured to distinguish between the pattern-type entry and the single-range entries. In some embodiments, the intervals specify respective offsets relative to a beginning of the period, at which the addresses are to be accessed. The pattern-type entry may specify a respective number of the addresses that are to be accessed at each of the offsets.

In an embodiment, the pattern-type entry specifies a length of the period. In an embodiment, the pattern-type entry specifies a number of times the period is repeated in the periodic pattern. In some embodiments, a size of the pattern-type entry is independent of a number of times the period is repeated in the periodic pattern.

There is additionally provided, in accordance with an embodiment of the present invention, a method in an input/output (I/O) device. The method includes accepting in the I/O device from a host a scatter/gather list including one or more entries. The entries include at least a pattern-type entry that specifies a period of a periodic pattern of addresses that are to be accessed in a memory of the host. Data is transferred between the I/O device and the memory of the host by accessing the addresses in the memory of the host in accordance with the periodic pattern at intervals indicated in the period.

The present invention will be more fully understood from the following detailed description of the embodiments thereof, taken together with the drawings in which:

BRIEF DESCRIPTION OF THE DRAWINGS

FIG. 5 is a diagram showing a pattern-type scatter/gather entry, in accordance with an embodiment of the present invention.

DETAILED DESCRIPTION OF EMBODIMENTS

Overview

Figure 1:
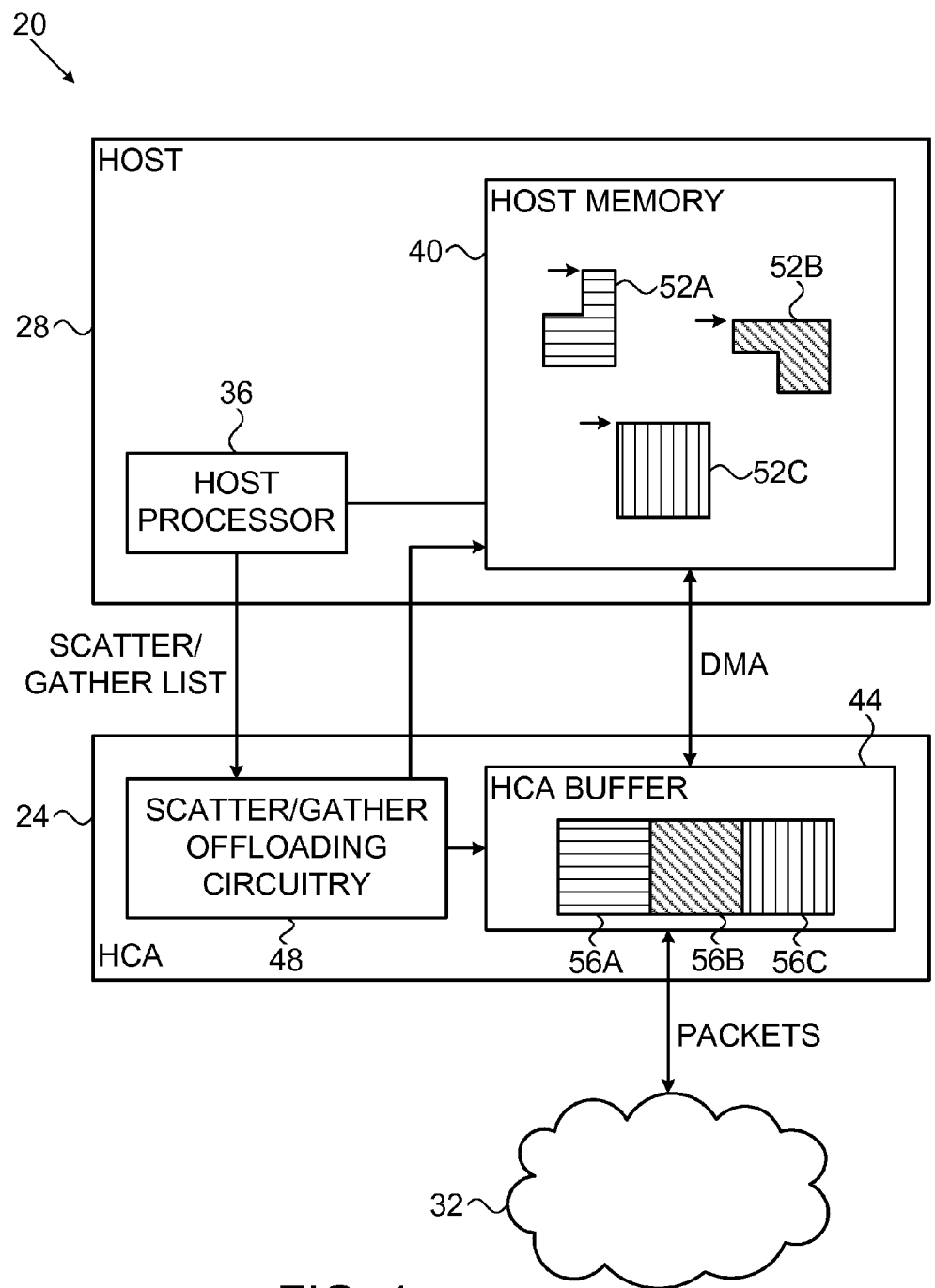
FIG. 1 is a block diagram that schematically illustrates a computer communication system, in accordance with an embodiment of the present invention.

Embodiments of the present invention that are described herein provide improved methods and systems for Direct Memory Access (DMA) in input/output (I/O) devices, including Network Interface Controllers (NICs) such as Infiniband (IB) Host Channel Adapters (HCAs). In the disclosed embodiments, a host communicates over a network via a NIC. As part of this communication, the NIC transfers data using DMA between a memory of the host and a memory buffer of the NIC. Other types of I/O devices implement similar sorts of DMA functionality, and the principles of the present invention, as described below, may similarly be applied to such I/O devices.

In a typical flow, the NIC accepts from the host a scatter/gather list, which comprises one or more entries specifying memory addresses in the host memory that are to be accessed (written in case of a scattering operation or read in case of a gathering operation). The NIC transfers the data between the memory buffer of the NIC and the memory addresses of the host memory that are specified in the scatter/gather list.

In some practical scenarios, the data is to be scattered or gathered in a certain periodic pattern of addresses in the host memory. The term "periodic" in the present context refers to repetitive or recurring patterns of addresses in the host memory, i.e., patterns that are periodic as a function of the address number, possibly in multiple dimensions.

For example, a matrix of data may be stored, row after row, in sequential addresses of the host memory, and the NIC may be requested to gather and send only a partial subset of the matrix columns. It is possible in principle to specify such an operation using scatter/gather entries that specify a respective contiguous address range for each entry from the matrix, but this approach is highly inefficient.

In some embodiments that are described herein, the NIC and the host support a type of scatter/gather entry that is dedicated to scattering or gathering data in periodic patterns of addresses in the host memory. Such an entry is referred to herein as a pattern-type entry. In the disclosed embodiments, the NIC comprises hardware circuitry that accepts from the host a scatter/gather list comprising at least one pattern-type entry. The hardware circuitry carries out the scattering or gathering operation specified in the list, thereby relieving the host processor of having to perform this task or to specify the individual scatter or gather addresses explicitly.

The pattern-type entry specifies the period (referred to as cycle) of the periodic pattern of addresses that are to be accessed in the host memory. For example, the pattern-type entry may specify the length of each cycle, the intervals within the cycle (e.g., offsets from the beginning of the cycle) at which data is to be accessed, and the number of addresses that should be accessed at each offset. The pattern-type entry typically also specifies the number of cycles to be performed. The hardware circuitry in the NIC transfers the data between the NIC memory buffer and the host memory in accordance with the periodic pattern, by accessing the memory addresses at the intervals indicated in the cycle.

The disclosed pattern-type scatter/gather entries represent the requested addresses in a highly compact manner, by exploiting the periodic nature of the address patterns. For example, the size of the pattern-type entry does not depend on the number of cycles (e.g., on the number of matrix rows in the above example). As such, the disclosed techniques are particularly suitable for accessing periodic patterns in large data structures, while at the same time keeping the scatter/gather list at a manageable size.

In some embodiments, the hardware circuitry of the NIC accepts a scatter/gather list that comprises both pattern-type entries and conventional entries that specify contiguous address ranges. The circuitry distinguishes between the different types of entries, and applies the appropriate processing to each entry type. Several examples of pattern-type scatter/gather entries are described hereinbelow. In some embodiments, the pattern-type entry is generalized to multi-dimensional periodic patterns, such as for accessing multi-dimensional data arrays.

System Description

FIG. 1 is a block diagram that schematically illustrates a computer communication system 20, in accordance with an embodiment of the present invention.

In system 20, a host computer 28 communicates over a communication network 32 using a Host Channel Adapter (HCA) 24. In the present example, network 32 comprises an Infiniband (IB) network, and HCA 24 operates in accordance with the Infiniband specifications. Infiniband communication is specified, for example, in "InfiniBand Architecture Specification Volume 1," release 1.2.1, November, 2007, which is incorporated herein by reference. In alternative embodiments, however, the disclosed techniques can be used with other suitable types of networks and NICs.

Host 28 comprises a host processor 36 and a host memory 40. HCA 24 communicates on behalf of the host by sending and receiving IB packets over network 32. The HCA comprises a memory buffer 44 that holds data for transmission in outgoing packets and data received in incoming packets.

HCA 24 transfers both outgoing data and incoming data between buffer 44 and host memory 40 using Direct Memory Access (DMA). Typically, the data in buffer 44 is organized in sequential memory locations. In host memory 40, on the other hand, the data corresponding to a given packet may be dispersed over multiple different memory addresses. In order to construct an outgoing packet or provide the data of an incoming data, the HCA is expected to transfer the data between the sequential memory locations in buffer 44 and the dispersed addresses in host memory 40. In the present context, data transfer from HCA buffer 44 to host memory 40 is referred to as a scatter operation, and data transfer from host memory 40 to HCA buffer 44 is referred to as a gather operation.

In the example of FIG. 1, the data of a certain outgoing packet is stored in three different memory regions 52A . . . 52C in the host memory. The starting address of each region is marked with an arrow in the figure, and the addresses of each region are marked with a different shading pattern. The data stored in regions 52A . . . 52C is to be fetched and assembled ("gathered") sequentially in respective regions 56A . . . 56C in buffer 44 of the HCA.

Similar functionality applies in the opposite direction: The data of a certain incoming packet may be stored in sequential regions 56A . . . 56C in HCA buffer 44, and these regions are to be transferred ("scattered") to respective regions 52A . . . 52C in host memory 40.

HCA 24 comprises scatter/gather hardware circuitry 48, which carries out the above-described DMA scatter and gather operations between HCA buffer 44 and host memory 40. Circuitry 48 offloads host processor 36 from carrying out these tasks. In a typical flow, circuitry 48 receives from host processor 36 a scatter/gather list that defines the memory addresses in host memory 40 to/from which data of a given packet is to be scattered or gathered. Circuitry 48 scatters or gathers the data in accordance with the list.

Typically, the scatter/gather list comprises multiple entries that define the memory addresses in question. In particular, HCA 24 and host 28 support a type of scatter/gather entry for specifying periodic patterns of addresses in host memory 40. Such entries are referred to herein as pattern-type entries, and their structure and functionality are described in detail below.

The system and HCA configurations shown in FIG. 1 are example configurations, which are chosen purely for the sake of conceptual clarity. In alternative embodiments, any other suitable system or HCA configuration can be used. Some elements of HCA 24 and/or host 28 may be implemented in hardware, e.g., in one or more Application-Specific Integrated Circuits (ASICs) or Field-Programmable Gate Arrays (FPGAs). Additionally or alternatively, some HCA or host elements can be implemented using software, or using a combination of hardware and software elements.

In some embodiments, some of the functions of HCA 24 or host 28 may be carried out by a general-purpose computer, which is programmed in software to carry out the functions described herein. The software may be downloaded to the computer in electronic form, over a network, for example, or it may, alternatively or additionally, be provided and/or stored on non-transitory tangible media, such as magnetic, optical, or electronic memory.

DMA Using Pattern-Type Scatter/Gather Entries

In many practical cases, the data to be scattered or gathered is stored in a certain periodic pattern of addresses in host memory 40. In an example scenario, a matrix of data is stored, row after row, in sequential addresses of memory 40, and the HCA is requested to gather and send one or more columns of the matrix. For ease of explanation, the description that follows refers mainly to gather operations, i.e., transfer of data from host memory 40 to HCA buffer 44. The disclosed techniques, however, are applicable in a similar manner to scatter operations as well, i.e., transfer of data from HCA buffer 44 to host memory 40. For example, the data of a given packet may be scattered into one or more columns of a matrix stored in the host memory.

In another example scenario, the host memory may hold a list of data blocks DATA0, DATA1, DATA2, ..., DATAn and a separate list of metadata items (e.g., signatures) META0, META1, META2, ..., METAn, such that each data block is associated with a respective metadata item. The disclosed techniques can be used to gather an interleaved stream of the form {DATA0, META0, DATA1, META1, DATA2, META2, ..., DATAn, METAn}. This stream can be described as two data structures that are cycled repetitively. The HCA may similarly interleave more than two data structures in this manner.

In some embodiments, host 28 and HCA 24 support a dedicated type of scatter/gather list entry for specifying periodic patterns of addresses in host memory that are to be accessed (written as part of a scattering operation or read as part of a gathering operation). This type of entry is referred to herein as a pattern-type entry. The pattern-type entry typically specifies the period of the periodic pattern (e.g., intervals within the period at which memory addresses should be accessed), as well as the number of periods to be performed.

Typically, hardware circuitry 48 in HCA 24 accepts from host processor 36 a scatter/gather list that comprises multiple entries. The list comprises at least one pattern-type entry, and may comprise conventional scatter/gather entries either preceding or following the pattern-type entry. Circuitry 48 transfers data between HCA buffer 44 and the memory addresses in host memory 40 specified by the list. In particular, upon identifying a pattern-type entry, circuitry 48 accesses (reads or writes) the specified periodic pattern of addresses in memory 40, in accordance with the intervals specified in the pattern-type entry.

Figure 2:
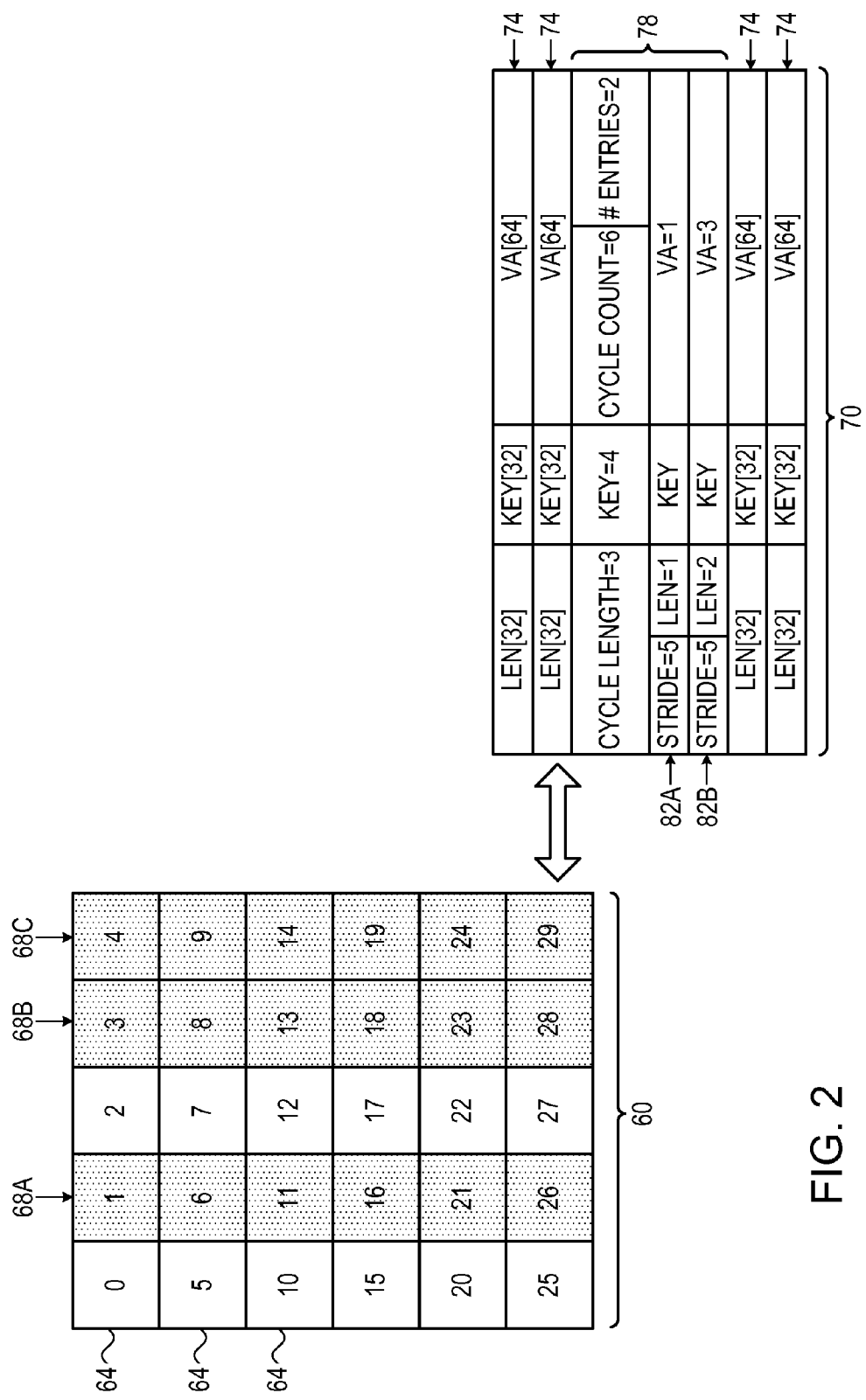
FIG. 2 is a diagram that schematically illustrates a scatter/gather list comprising pattern-type entries, in accordance with an embodiment of the present invention.

FIG. 2 is a diagram that schematically illustrates a scatter/gather list 70 comprising a pattern-type entry 78, in accordance with an embodiment of the present invention. In the example of FIG. 2, a data matrix 60 is stored sequentially, row after row, in host memory 40. Matrix 60 comprises thirty matrix elements 64, arranged in six rows by five columns. The order of storage in host memory 40 is shown in the figure: Each matrix element is marked with its storage address (0 ... 29), represented as an offset relative to some base address.

In the present example, HCA 24 is requested to gather the second, fourth and fifth columns of matrix 60 (denoted 68A, 68B and 68C, respectively, and shaded in the figure) and store them sequentially in HCA buffer 44. This subset of columns forms a periodic pattern of the sequentially-stored matrix elements 64: The HCA is requested to gather the data from addresses 1, 3, 4, 6, 8, 9, 11, 13, 14, 16, 18, 19, 21, 23, 24, 26, 28 and 29. This periodic pattern has a period whose length is five addresses, and the second, fourth and fifth addresses in each period are to be accessed. Six such periods (also referred to as cycles) are to be performed.

Scatter/gather list 70 comprises a pattern-type entry 78 that specifies this periodic pattern. In this example, the pattern-type entry is preceded and succeeded by conventional scatter/gather entries 74 that specify consecutive blocks of data to be accessed. Each conventional entry 74 comprises a 32-bit length field that specifies the length of the data to be accessed, a 64-bit Virtual Address (VA), and a 32-bit key that is used by the HCA to find the context with the rule that translates the VA into a physical address in host memory 40.

Pattern-type entry 78 specifies the periodic pattern in terms of cycles and sub-entries. The basic period of the periodic pattern is referred to as a cycle. The cycle (period) is specified in terms of one or more sub-entries. Each sub-entry defines one or more successive addresses (e.g., bytes) that are to be accessed in the cycle. In the example of FIG. 2, each cycle corresponds to a respective row of matrix 60, i.e., six cycles are to be performed. Within the cycle, one sub-entry specifies accessing the second address in the cycle (second matrix column), and another sub-entry specifies accessing the fourth and fifth addresses in the cycle (fourth and fifth matrix columns).

Pattern-type entry 78 comprises a header, which comprises the following fields:

- A KEY field having a dedicated value (e.g., KEY=4) that identifies entry 78 as a pattern-type entry and distinguishes it from other types of scatter/gather entries. Circuitry 48 uses the KEY field to detect the pattern-type entry and apply the appropriate processing.
- A #ENTRIES field, which specifies the number of sub-entries in the pattern-type entry. In the example of FIG. 2, #ENTRIES=2.
- A CYCLE LENGTH field, which specifies the number of addresses (e.g., bytes) to be accessed in the cycle (period). In the present example, CYCLE LENGTH=3.
- A CYCLE COUNT field, which specifies the number of cycles (periods) to be performed. In the example of FIG. 2, CYCLE COUNT=6. In some embodiments, CYCLE COUNT=0 indicates an infinite number of cycles.

The two sub-entries of pattern-type entry 78 are denoted 82A and 82B in the figure. Each sub-entry comprises the following fields:

- A STRIDE field, which specifies the interval between addresses accessed by this sub-entry in successive cycles.
- A VA field, which specifies the memory location of the first address accessed by the sub-entry on the first cycle.
- A KEY field that is used by the HCA to find the context with the rule that translates the VA to a physical address in memory 40.
- A LEN field, which specifies the number of successive addresses accessed by the sub-entry.

In the present example, sub-entry 82A specifies accessing the second address in each cycle (STRIDE=5, VA=1, LEN=1). Sub-entry 82B specifies accessing the fourth and fifth addresses in each cycle (STRIDE=5, VA=3, LEN=2).

The format of pattern-type entry 78 provides an efficient, compact representation for specifying periodic address patterns. Note, for example, that the size of pattern-type entry 78 (the number of sub-entries) is not dependent on the size of the data (e.g., on the number of matrix rows). By contrast, if the same pattern were to be specified using conventional scatter/gather entries 74, the number of entries 74 would grow linearly with the number of rows. Thus, the disclosed pattern-type scatter/gather entries are highly efficient for accessing large volumes of data.

The example pattern-type entry format shown in FIG. 2 is chosen purely for the sake of conceptual clarity. In alternative embodiments, the pattern-type scatter/gather entry may have any other suitable format. In particular, the period (cycle) of the periodic pattern, and the intervals at which memory addresses should be accessed within the period, can be defined in the pattern-type entry using any other suitable set of parameters.

Figure 3:
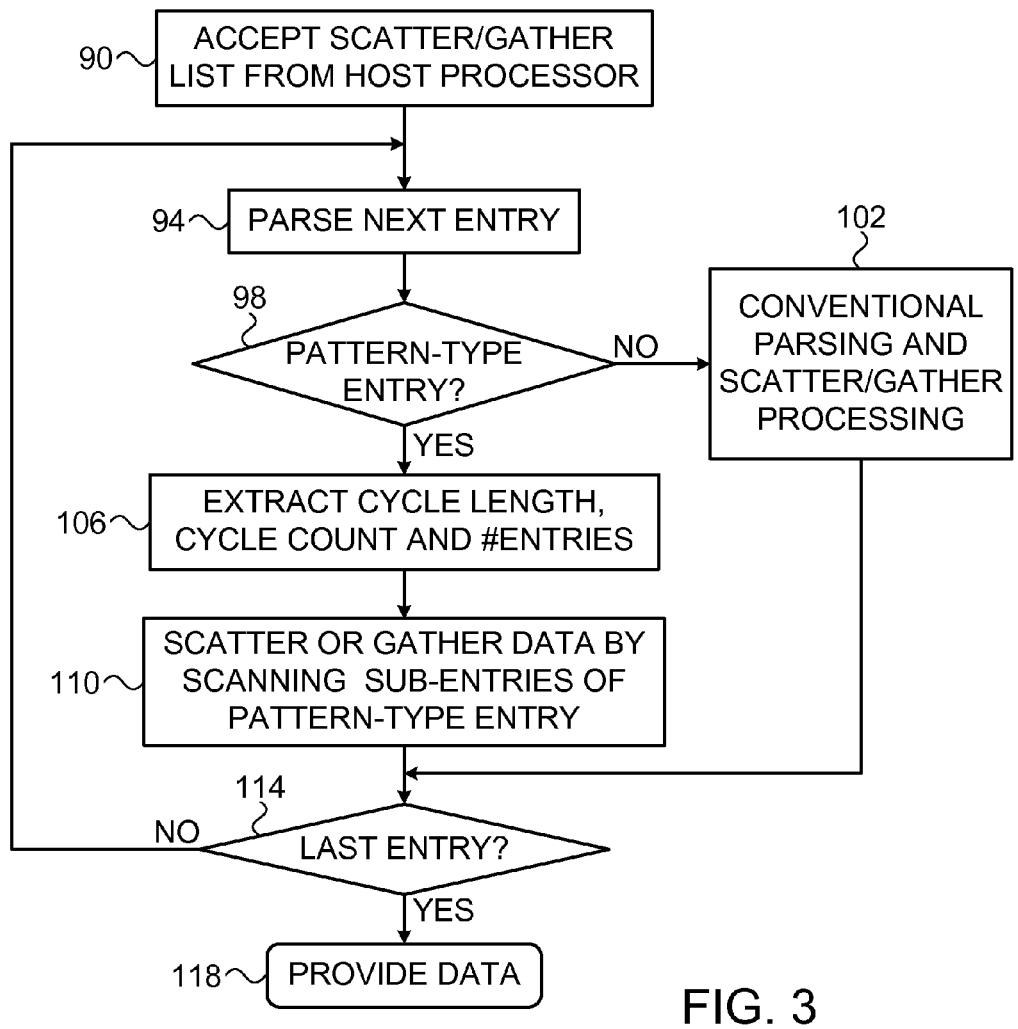
FIG. 3 is a flow chart that schematically illustrates a method for Direct Memory Access (DMA) using pattern-type scatter/gather entries, in accordance with an embodiment of the present invention.

FIG. 3 is a flow chart that schematically illustrates a method for DMA using pattern-type scatter/gather entries 78, in accordance with an embodiment of the present invention. The method begins with hardware circuitry 48 of HCA 24 accepting a scatter/gather list from host processor 36, at an input step 90.

Circuitry 48 parses the next scatter/gather entry on the list, at a parsing step 94. Circuitry 48 checks whether the parsed entry is a pattern-type entry, at a pattern-type checking step 98. For example, circuitry 48 may check the KEY field of the entry and conclude that the entry is a pattern-type entry if KEY=4.

If the entry is not a pattern-type entry, circuitry 48 processes the entry using conventional processing, at a conventional entry processing step 102. The circuitry typically determines the address to be accessed in memory 40 based on the VA and KEY fields of the entry, and then accesses (reads or writes) LEN addresses staring at that address.

If, on the other hand, step 98 concludes that the next scatter/gather entry is a pattern-type entry, circuitry 48 extracts the CYCLE LENGTH, CYCLE COUNT and #ENTRIES fields from the header of the entry, at a pattern parameter extraction step 106. Circuitry 48 then accesses the addresses in host memory 40 specified in the periodic pattern, at a memory access step 110. Circuitry 48 typically scans the sub-entries of the pattern-type entry and accesses (reads or writes) the memory addresses specified in the sub-entries. The sub-entries are scanned CYCLE COUNT times, after which execution of the pattern-type entry is complete.

Circuitry 48 checks whether the currently completed scatter/gather entry was the last entry on the scatter/gather list, at a completion checking step 114. If not, the method loops back to step 94 above in which circuitry 94 proceeds to parse the next entry on the scatter/gather list. If the last scatter/gather entry was executed, the data is provided as output, at an output step 118, and the method terminates.

For scatter operations, at this stage the data of the incoming packet has been transferred from HCA buffer 44 to the specified addresses in host memory 40. The host processor and/or the HCA may apply any suitable processing to this data. For gather operations, at this stage the data intended for transmission has been transferred from the specified addresses in host memory 40 to HCA buffer 44. The HCA typically produces an outgoing packet that carries this data, and sends the packet over network 32.

The example of FIG. 2 above accesses a periodic pattern of addresses in a two-dimensional data structure (matrix 60) stored in host memory 40. The disclosed techniques, however, are in no way limited to two-dimensional data structures. In alternative embodiments, the disclosed pattern-type scatter/gather entries can be used to extract data having a periodic pattern from a data structure having any desired number of dimensions.

Figure 4:
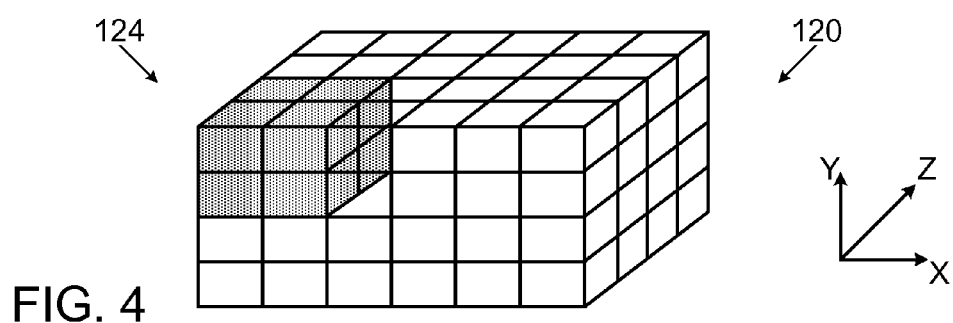
FIG. 4 is a diagram showing a multi-dimensional data structure accessed using pattern-type entries, in accordance with an embodiment of the present invention.

FIG. 4 is a diagram showing a multi-dimensional data structure accessed using pattern-type entries, in accordance with an embodiment of the present invention. The present example shows a three-dimensional data array 120. A sub-array 124 of array 120 is shaded in the figure. In an embodiment, circuitry 48 accepts a scatter/gather list, which comprises a pattern-type entry that specifies accessing sub-array 124. Multi-dimensional sub-arrays such as sub-array 124 can also be represented using pattern-type entries, as demonstrated in FIG. 5 further below.

Although the example of FIG. 4 shows a continuous sub-array, the disclosed techniques can be used to access non-continuous sub-arrays, as well. Although the examples of FIGS. 2 and 4 refer to two-dimensional and three-dimensional data structures, the disclosed techniques can be generalized in a straightforward manner to any desired number of dimensions.

In some embodiments, the disclosed techniques can be used by host 28 to carry out cooperative computing functions, such as functions specified in the Message Passing Interface (MPI). MPI functions are specified, for example, in "MPI: A Message-Passing Interface Standard," version 2.2, Sep. 4, 2009, which is incorporated herein by reference. In particular, section 4.1 of the MPI standard defines "derived data types," any of which can be accessed using the disclosed techniques.

FIG. 5 is a diagram showing a pattern-type scatter/gather entry, in accordance with an alternative embodiment of the present invention. The pattern-type entry of FIG. 5 accesses a multi-dimensional data structure, such as in the example of FIG. 4 above, by nesting two or more pattern-type entries similar to those of FIG. 2 above. In other words, the pattern-type entry specifies two or more periodic patterns that are nested in one another, and circuitry 48 accesses the appropriate addresses specified in the entry by scanning the nested periodic patterns.

The present example defines five nested layers, specified by the entries on lines 0-c, 10-2c, 30-3c, 40-4c and 50-5c, respectively. The 0x00000004 value in line is an identifier indicating a pattern-type entry without stride, for each cycle that this entry is encountered. The 0x00000005 value in line 14 is an identifier indicating a pattern-type entry with stride, for each cycle that this entry is encountered.

The stride value in line 20 indicates the stride to be added to VAs for each cycle this stride is encountered. In other words, the number of times this stride is added is according to the cycle count in the entry of the preceding layer, i.e., the layer defined by lines 0-c. The stride values in lines 30, 40 and 50 indicate the stride to be added to VAs for each cycle this stride is encountered. In other words, the number of times this stride is added is according to the cycle count in the entry of the preceding layer, i.e., the layer defined by lines 10-2c.

In the present example, the start VA to be accessed in each sub-entry is specified using va_hi and va_lo fields. The actual VA to be accessed is given by the following calculation. In this calculation, layer0 is the most external layer of nesting, i.e., the one described by the first appearing pattern-type entry in the list of entries. Layer1 is nested in layer0, etc: va+(cycles_done_of_layer0×stride_layer1)+
(cycles_done_of_layer1×stride_layer2)+
(cycles_done_of_layer2×stride_layer3)+
(cycles_done_of_layer3×stride_layer4)+
(cycles_done_of_layer4×stride_layer5)+ . . .

Although the embodiments described herein mainly address scattering and gathering of matrices of various dimensions, the methods and systems described herein can also be used in other applications, such as in scattering and gathering of data and metadata that reside in separate locations, or interleaving of data partitions.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An input/output (I/O) device, comprising:
   a memory buffer; and
   off-loading hardware, which is configured to accept from a host a scatter/gather list comprising one or more entries, including at least a pattern-type entry that specifies a period of a two or more periodic patterns of addresses nested in one another, which are to be accessed in a memory of the host, and to transfer data between the memory buffer of the I/O device and the memory of the host by accessing the addresses in the memory of the host in accordance with the periodic patterns at intervals indicated in the period.

2. The device according to claim 1, wherein the off-loading hardware is configured to access the addresses by scanning the nested periodic patterns.

3. The device according to claim 1, wherein, by accessing the addresses in accordance with the periodic patterns, the off-loading hardware is configured to access a partial subset of columns of a matrix that is stored, row after row, in a sequential range of the addresses.

4. The device according to claim 1, wherein, by accessing the addresses in accordance with the periodic patterns, the off-loading hardware is configured to access a partial sub-range of a multi-dimensional data structure that is stored in a sequential range of the addresses.

5. The device according to claim 1, wherein, by accessing the addresses in accordance with the periodic patterns, the off-loading hardware is configured to interleave two or more data structures that are stored in separate address ranges in the memory of the host.

6. The device according to claim 1, wherein the scatter/gather list further comprises one or more single-range entries that specify respective contiguous address ranges that are to be accessed in the memory of the host, and wherein the off-loading hardware is configured to distinguish between the pattern-type entry and the single-range entries.

7. The device according to claim 1, wherein the intervals specify respective offsets relative to a beginning of the period, at which the addresses are to be accessed.

8. The device according to claim 7, wherein the pattern-type entry specifies a respective number of the addresses that are to be accessed at each of the offsets.

9. The device according to claim 1, wherein the pattern-type entry specifies a length of the period.

10. The device according to claim 1, wherein the pattern-type entry specifies a number of times the period is repeated in the periodic patterns.

11. The device according to claim 1, wherein a size of the pattern-type entry is independent of a number of times the period is repeated in the periodic patterns.

12. A method, comprising:
    in an input/output (I/O) device, accepting from a host a scatter/gather list comprising one or more entries, including at least a pattern-type entry that specifies a period of a two or more periodic patterns of addresses nested in one another, which are to be accessed in a memory of the host; and
    transferring data between the I/O device and the memory of the host by accessing the addresses in the memory of the host in accordance with the periodic patterns at intervals indicated in the period.

13. The method according to claim 12, wherein accessing the addresses comprises scanning the nested periodic patterns.

14. The method according to claim 12, wherein accessing the addresses in accordance with the periodic patterns comprises accessing a partial subset of columns of a matrix that is stored, row after row, in a sequential range of the addresses.

15. The method according to claim 12, wherein accessing the addresses in accordance with the periodic patterns comprises accessing a partial sub-range of a multi-dimensional data structure that is stored in a sequential range of the addresses.

16. The method according to claim 12, wherein accessing the addresses in accordance with the periodic patterns comprises interleaving two or more data structures that are stored in separate address ranges in the memory of the host.

17. The method according to claim 12, wherein the scatter/gather list further comprises one or more single-range entries that specify respective contiguous address ranges that are to be accessed in the memory of the host, and comprising distinguishing between the pattern-type entry and the single-range entries.

18. The method according to claim 12, wherein the intervals specify respective offsets relative to a beginning of the period, at which the addresses are to be accessed.

19. The method according to claim 18, wherein the pattern-type entry specifies a respective number of the addresses that are to be accessed at each of the offsets.

20. The method according to claim 12, wherein the pattern-type entry specifies a length of the period.

21. The method according to claim 12, wherein the pattern-type entry specifies a number of times the period is repeated in the periodic patterns.

22. The method according to claim 12, wherein a size of the pattern-type entry is independent of a number of times the period is repeated in the periodic patterns.

* * * * *